United States Patent
Browne et al.

(10) Patent No.: US 8,104,793 B2
(45) Date of Patent: Jan. 31, 2012

(54) PYROTECHNIC TRIGGERING OF THERMALLY ACTIVATED SHAPE MEMORY MATERIALS FOR SELECTIVELY CHANGING A STRUCTURAL AND/OR MECHANICAL PROPERTY OF A VEHICLE MEMBER

(75) Inventors: Alan L. Browne, Grosse Pointe, MI (US); Kenneth A. Strom, Washington, MI (US); Nilesh D. Mankame, Ann Arbor, MI (US); Mark A. Kramarczyk, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 505 days.

(21) Appl. No.: 11/346,949

(22) Filed: Feb. 3, 2006

(65) Prior Publication Data

US 2007/0182146 A1 Aug. 9, 2007

(51) Int. Cl.
B60R 21/04 (2006.01)
B60R 21/055 (2006.01)
(52) U.S. Cl. .......................... 280/753; 280/748; 180/271
(58) Field of Classification Search .................. 280/753, 280/736, 748; 60/527, 528, 632, 635, 636; 148/562, 563, 402; 102/275.1; 180/271
See application file for complete search history.

(56) References Cited

U.S. PATENT DOCUMENTS

| | | | |
|---|---|---|---|
| 5,285,728 A * | 2/1994 | Dolivet | 102/275.1 |
| 5,407,160 A * | 4/1995 | Hollingsworth et al. | 248/220.43 |
| 6,079,685 A * | 6/2000 | Jacquemin | 248/304 |
| 6,663,821 B2 * | 12/2003 | Seward | 264/512 |
| 6,910,714 B2 * | 6/2005 | Browne et al. | 280/753 |
| 7,077,428 B2 * | 7/2006 | Barker et al. | 280/736 |
| 7,093,817 B2 * | 8/2006 | MacGregor et al. | 251/11 |
| 7,264,271 B2 * | 9/2007 | Barvosa-Carter et al. | 280/751 |
| 7,267,367 B2 * | 9/2007 | Barvosa-Carter et al. | 280/753 |
| 7,288,326 B2 * | 10/2007 | Elzey et al. | 428/593 |
| 7,350,851 B2 * | 4/2008 | Barvosa-Carter et al. | 296/187.02 |
| 7,401,845 B2 * | 7/2008 | Alexander et al. | 296/187.01 |
| 7,594,697 B2 * | 9/2009 | Browne et al. | 297/216.12 |
| 7,600,301 B2 * | 10/2009 | Rudduck et al. | 24/606 |
| 7,637,559 B2 * | 12/2009 | Browne et al. | 296/187.02 |
| 7,735,901 B2 * | 6/2010 | Melz et al. | 296/146.6 |
| 2002/0113420 A1 * | 8/2002 | Neunzert et al. | 280/736 |
| 2003/0209894 A1 | 11/2003 | Larsen et al. | 280/736 |
| 2004/0195815 A1 * | 10/2004 | Browne et al. | 280/753 |
| 2005/0158573 A1 * | 7/2005 | Elzey et al. | 428/593 |
| 2005/0198907 A1 * | 9/2005 | McKnight et al. | 49/475.1 |
| 2005/0217767 A1 * | 10/2005 | Barvosa-Carter et al. | 148/563 |
| 2005/0218696 A1 * | 10/2005 | Aase et al. | 296/187.02 |
| 2006/0000211 A1 * | 1/2006 | Webster | 60/527 |
| 2006/0125218 A1 * | 6/2006 | Guth et al. | 280/732 |
| 2006/0125291 A1 * | 6/2006 | Buravalla et al. | 296/204 |
| 2008/0150260 A1 * | 6/2008 | Whang et al. | 280/728.1 |
| 2010/0066060 A1 * | 3/2010 | Kalandek | 280/728.2 |
| 2010/0230941 A1 * | 9/2010 | Hirth et al. | 280/733 |

* cited by examiner

Primary Examiner — Ruth Ilan
Assistant Examiner — Karen A Beck (57) ABSTRACT

A vehicle member generally comprises a thermally activated shape memory material in operative communication with a pyrotechnic device. The pyrotechnic device is effective to thermally change a dimension, a shape, an orientation change, an elastic modulus property change or a combination comprising at least one of the foregoing properties of the shape memory material, which results in a structural and/or mechanical change to the vehicle member.

10 Claims, 4 Drawing Sheets

PYROTECHNIC TRIGGERING OF THERMALLY ACTIVATED SHAPE MEMORY MATERIALS FOR SELECTIVELY CHANGING A STRUCTURAL AND/OR MECHANICAL PROPERTY OF A VEHICLE MEMBER

BACKGROUND

The present disclosure generally relates to pyrotechnic triggering of thermally activated shape memory materials for selectively changing a structural and/or mechanical property of a vehicle member.

Numerous methods have been employed to adjust or to modify the mechanical and structural properties of vehicle members such as may be desired during an impact event. Such methods can include locally or globally changing properties of the vehicle member. For example, for vehicle members that include a hollow profile, foam can be disposed within the hollow profile to provide energy absorption resulting from the impact event. However, the various known methods in the art generally provide a fixed response and the vehicle members themselves cannot be remotely controlled and/or actively manipulated.

In view of the foregoing, there remains a need in the art for improved vehicle members and methods that provide selective and rapid activation during a triggering event. Additionally, it would be desirable if the vehicle members once triggered could be reset.

BRIEF SUMMARY

Disclosed herein are vehicle members and methods wherein an exotherm produced by discharging a pyrotechnic material changes at least one attribute in a shape memory material in operative communication with the vehicle member such that the structural and/or mechanical parties of the vehicle member change with the change in at least one attribute. In one embodiment, a vehicle member comprises at least one thermally activatable shape memory material; a pyrotechnic material in operative communication with the shape memory material, wherein the pyrotechnic material is effective to thermally change a dimension, shape, orientation, an elastic modulus property or a combination comprising at least one of the foregoing properties of the shape memory material in response to a triggering event; and an activation device for selectively discharging the pyrotechnic material. The triggering can be in response to sensor inputs that detect an active or predicted impact event, for example.

A method for selectively changing a structural or mechanical property of a vehicle member comprises disposing a shape memory material in operative communication with the vehicle member; discharging a pyrotechnic material to produce heat; and directing the heat at the shape memory material, wherein the heat is effective to thermally activate the shape memory material and change at least one attribute thereof, wherein the change in the at least one attribute to the shape memory material changes the structural or mechanical property of the vehicle member.

A displacement device comprises a vessel comprising a top wall, a bottom wall, and sidewalls extending therefrom; a piston assembly comprising a piston head slidably engaged with the vessel sidewalls and a shaft extending from the piston head, wherein the shaft is in operative communication with a displaceable vehicle component and the piston head defines a first chamber and a second chamber, the piston head comprising at least one fluid passageway extending between the first and second chambers; a shape memory material in operative communication with the piston assembly; and a pyrotechnic material disposed in the second chamber, wherein the pyrotechnic material produces an exotherm in fluid communication with the shape memory material, wherein the exotherm is effective to heat the shape memory material and change at least one attribute thereto, wherein the change in the at least one attribute resets a position of the piston head.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

The present disclosure generally relates to the pyrotechnic triggering of thermally activated shape memory materials in operative communication with a vehicle member or sub-system. More particularly, the disclosure relates to the pyrotechnic triggering of thermally activated shape memory materials that effectively changes a dimension, shape, orientation, an elastic modulus property, or a combination comprising at least one of the foregoing properties, which result in a mechanical and/or structural property change of the vehicle member (or sub-system) in response to a triggering event. The exothermic discharge of a pyrotechnic material rapidly heats the thermally activated shape memory material so as to provide rapid reaction times suitable for crash-based sensing. Heating can be effected convectively, conductively, and/or radiatively depending on the intended application and configuration. As used herein, the term "vehicle member" refers to various parts of the vehicle, which include, but are not limited to, reinforcing members, rails, framing members, sway bars, steering columns, pillars, interior vehicle surfaces, trim assemblies, knee bolsters, and the like. In addition, the vehicle member may comprise panels or shell-like structures of the vehicle such as, for example, door panels, hood panels, body panels, deck lids, and the like or may be in cooperating relationship with the vehicle member, e.g., thermal activation of the vehicle member displaces the panel. Other suitable parts, or components that are encompassed by the term vehicle members will be apparent to those skilled in the art in view of this disclosure. Although reference will be made herein to automotive applications, it is contemplated that the vehicle member can be employed in airplanes, trains, buses, trucks, vans, recreational vans, and the like.

The vehicle members generally include, locally or globally disposed, a thermally activated shape memory material that is in contact with and/or in close proximity to a pyrotechnic device such that triggering the pyrotechnic device results in an exothermic discharge effective to cause a dimension, shape, and/or elastic modulus change to the thermally activated shape memory material. The change in the shape memory material effectively changes a mechanical and/or structural property to the vehicle member. In this manner, the structural and/or mechanical properties of the vehicle member can be actively manipulated upon a triggering event. For example, depending on the location of the vehicle member within the vehicle, thermal activation of the shape memory material can be adapted to reinforce the vehicle member or the structural integrity can be selectively decreased. For example, thermally activating a shape memory alloy material can change its phase from a relatively softer martensite phase to a stiffer austenite phase, thereby providing reinforcement. The various phase changes available to the different thermally activated shape memory materials will be discussed in greater detail below.

The terms "in contact with" and "close proximity" generally refer to a distance in which exothermic heat generated from the pyrotechnic device upon a triggering event is effective to thermally change at least one attribute of the shape memory material. That is, exothermic discharge from the pyrotechnic device is in thermal communication (e.g., convective, radiative, and/or conductive) with the thermally activated shape memory material. As will be discussed in greater detail below, the shape memory material may be coated, layered, or embedded with the pyrotechnic material. Likewise, the shape memory material may be coated, layered, or embedded within the vehicle member. In addition, the pyrotechnic material itself may be in the form of a coating, pellets, a self contained structure such as may be available in an airbag module, or the like. By way of example, upon triggering the pyrotechnic device, exhaust from the exothermic reaction can be fluidly directed at and about the shape memory material to effect the change in at least one attribute. As another example, the exothermic reaction directly transfers heat to the shape memory material, e.g., as a pyrotechnic coating. In still another example, radiative transfer from a high intensity flash, provided by the pyrotechnic discharge can be used. In any of these embodiments, rapid cooling by the release for example of liquid nitrogen, vaporization of a refrigerant, and the like can be used.

The nature of the pyrotechnic material in the pyrotechnic device to generate the exotherm is relatively rapid compared to other forms of heating. In this manner, the use of the pyrotechnic material with the thermally activated shape memory material can provide rapid activation on the order of milliseconds for applications that desire rapid activation such as may be desired during an impact event.

Suitable thermally active shape memory materials include, but are not limited to, shape memory alloys (SMAs), shape memory polymers (SMPs), and the like, as well as composite compositions comprising at least one of the foregoing shape memory materials. These shape memory materials generally have the ability to return to some previously defined shape or size when subjected to an appropriate thermal stimulus. Specifically, after being deformed pseudoplastically, SMAs can be restored to their original shape by heating them above a characteristic temperature. In this manner, SMAs can change shape, dimension and/or stiffness in response to triggering by the pyrotechnic device. The shape memory alloys and shape memory polymers may further include a return mechanism in some embodiments to restore the original geometry of the vehicle member. The return mechanism can be mechanical, pneumatic, hydraulic, pyrotechnic, or based on one of the aforementioned shape memory materials.

Figure 1:
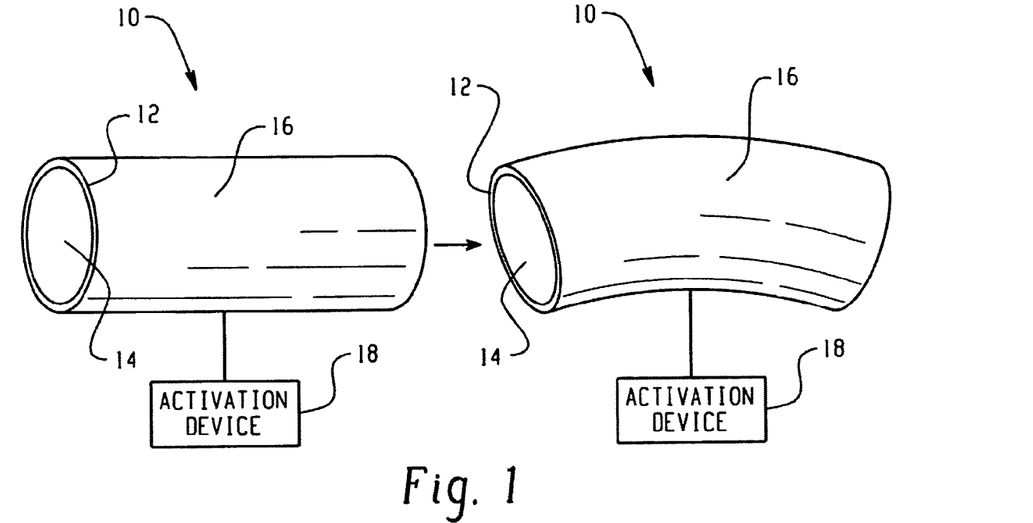
FIG. 1 illustrates a partial perspective view of a vehicle member prior to activation in accordance with one embodiment of the disclosure.

Referring now to FIG. 1, there is shown an exemplary vehicle member 10 comprising at least one shape memory material 12 disposed about an exterior of a supporting member 14. The supporting member 14 is not intended to be limited to the exact shape or form shown and can comprise a variety of shapes and forms suitable for use as a vehicle member within a vehicle environment as described above. In one embodiment, a pyrotechnic material 16 is disposed on the shape memory material 12 such that the exotherm produced upon triggering the pyrotechnic material is in direct contact with the shape memory material. The exposure of the shape memory material to the exotherm changes at least one attribute of the shape memory material 12, which changes the physical properties of the vehicle member 10. In the illustrated example, the thermal activation of the shape memory material causes the supporting member 14 to change from a linear shape to a curvilinear shape. To permit the change in shape, the supporting member is formed of a material as well as a dimension having a flexural strength effective to meet the desired objectives. Other embodiments include selecting the shape memory material and configuring this material with the supporting member such that the modulus properties of the vehicle member are selectively changed. Using an impact event as an example, the change in modulus can result in energy absorption or energy distribution along a pre-defined pathway during the impact event. It should be noted that the deformation is no limited to bending as provided in the figure. As will be apparent to those skilled in the art in view of this disclosure, other deformation modes include different shape changes, dimension, a shape, an orientation, an elastic modulus property or a combination comprising at least one of the foregoing properties of the shape memory material in response to the triggering event.

Depending on the intended application as well as the configuration of the vehicle member, the exothermic discharge of the pyrotechnic material 16 can provide convective, conductive, and/or radiant heat to the shape memory material. An activation device 18 is in operative communication with the pyrotechnic material to trigger the pyrotechnic material.

Figure 2:
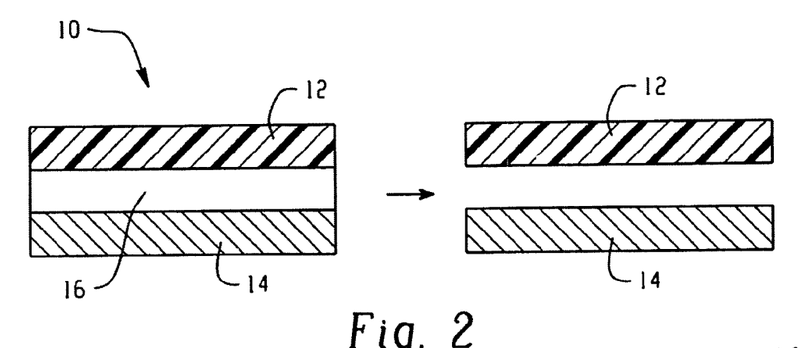
FIG. 2 illustrates a cross sectional view of the vehicle member in accordance with another embodiment.

Although the pyrotechnic material 16 is shown as externally disposed about the shape memory material 12, it should be apparent that other variations could be employed. For example, the pyrotechnic material 16 could be disposed intermediate the shape memory material 12 and the supporting member 14 as shown in the cross section of FIG. 2. By disposing the pyrotechnic material 16 intermediate to the supporting member 14 and the shape memory material 12, triggering the pyrotechnic material 16 could be used to directly transfer heat to the shape memory material 12 via conduction from the supporting member 14, thereby affecting the mechanical, dimensional, and structural properties of the vehicle member. Similarly, instead of a layer of the pyrotechnic material 16 about the shape memory material 12, partial layers can be employed as well as the use of pellets or the like so long as the pyrotechnic material 16 is disposed in thermal communication with the shape memory material 12.

Figure 3:
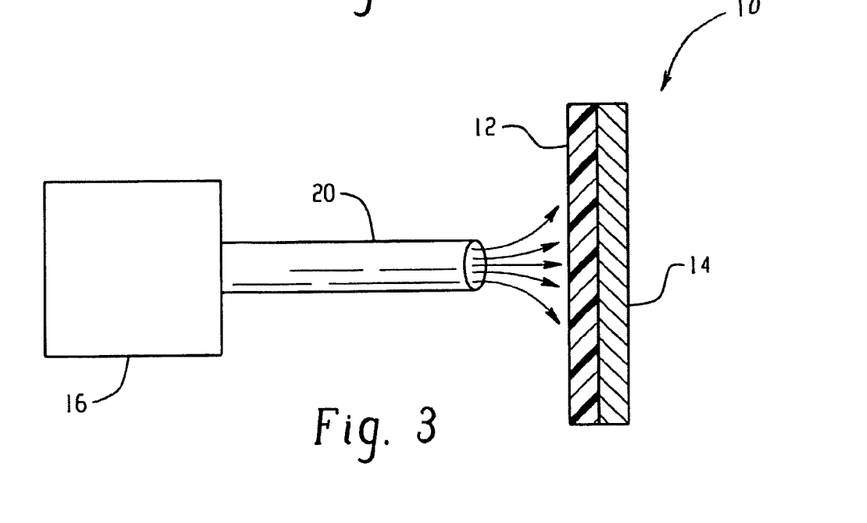
FIG. 3 illustrates a cross sectional view of the vehicle member in accordance with yet another embodiment.

Still further, a conduit 20 as shown in FIG. 3 in fluid communication with the shape memory material 12 and the pyrotechnic material 16 could be employed such that an exothermic discharge in the form of heated gases from triggering the pyrotechnic material 16 could be directed through the conduit 20 and about the shape memory material 12. For example, the conduit could provide fluid communication with a pyrotechnic device disposed in an airbag module (e.g., an inflator) to the shape memory material. The inflator generally serves to provide inflation upon discharge of the pyrotechnic material 16, typically in the form of a hot gas to inflate an airbag cushion. The exothermic reaction typically used to generate the gas to inflate the airbags results in the liberation of a significant amount of heat at temperatures as high as about 800° Kelvin (K) or more. A diverter valve can be employed to divert a portion of the heated gas to the conduit. As such, the liberated heat can be used to thermally change at least one attribute of the shape memory material 12 in the vehicle member 10, occurring independent from, or in parallel with, or after inflation, of the airbag. In this manner, depending on the cooperative relationship of the pyrotechnic material 16 with the shape memory material 12, the exothermic discharge produced from the pyrotechnic material can be used in parallel with the discharge or after the pyrotechnic event has occurred. Other variations will be apparent to those skilled in the art in view of this disclosure.

Depending on the desired application, the composition, the amount, and the placement of the pyrotechnic material can vary significantly. Generally, the greater the amount of pyrotechnic materials will result in faster ignition, higher temperatures and rapid activation of the shape memory materials. Preferably, the shape memory material is selected to withstand the heat and is not destroyed by the combustion products. Alternatively, the shape memory material could be protected (e.g. by a coating, by encapsulating it in a protective cover, etc.) from the deleterious effects (e.g. very high temperatures, corrosive action, high pressure loads etc.) of the pyrotechnic discharge while still retaining its thermal activation influence. This approach is evident in some of the examples described below.

Thermally activating the shape memory material 12 with the pyrotechnic material 16 provides deployment times suitable for a variety of applications within the vehicle environment that require rapid activation, e.g., less than or equal to about 10 milliseconds. Such applications include, but are not intended to be limited to, hood lifters for selectively resetting or deploying a hood, vehicle interior an/or exterior surfaces (e.g., vehicle hood) for selectively stiffening or softening or deploying or resetting the interior and/or exterior surface, steering columns/wheels/hubs for moving or softening the rigidity of the steering column/wheels/hubs, knee bolsters, closures for deploying bolts/latches for perimeter locking, rail stiffening, offset impact stiffening, and the like.

Figure 4:
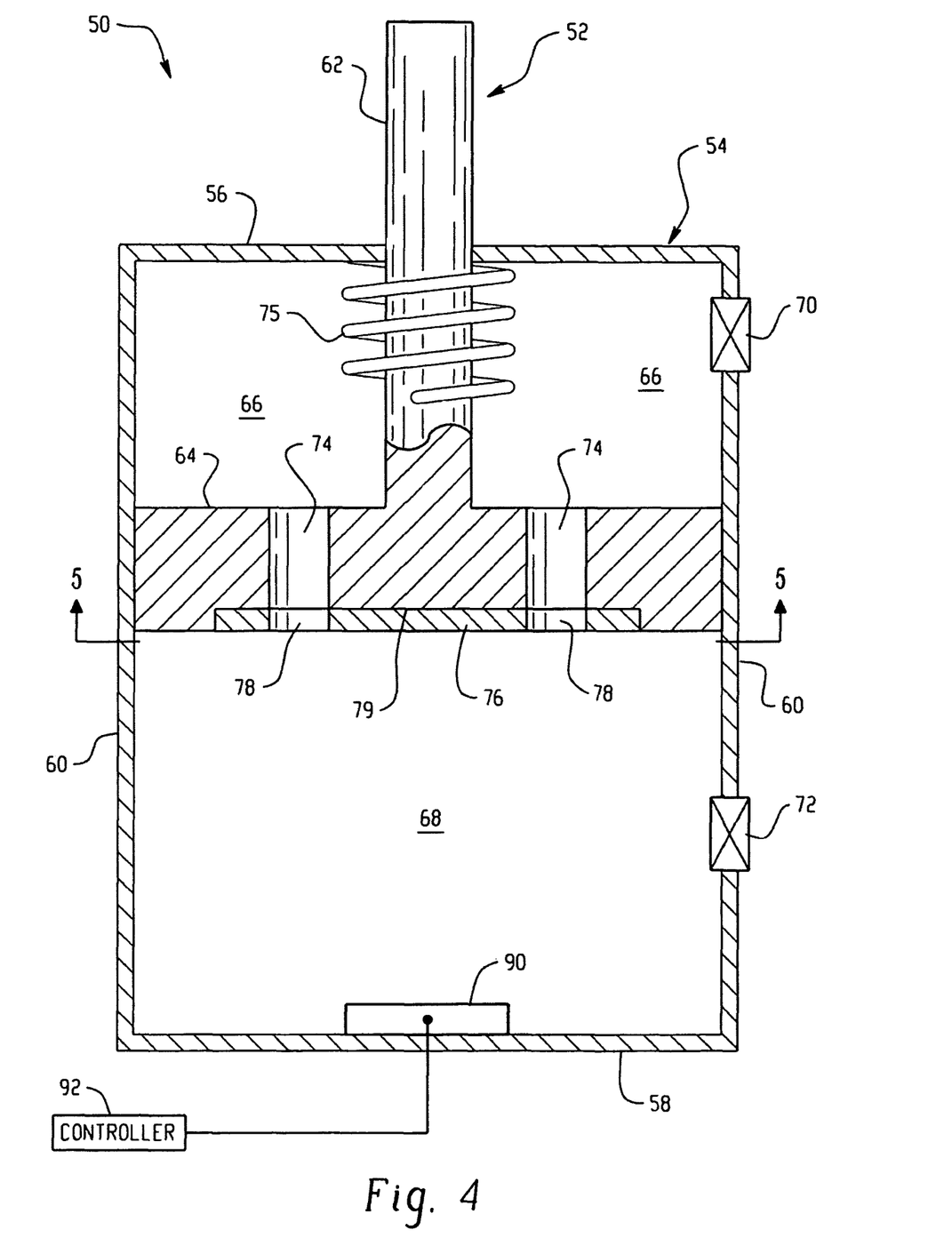
FIG. 4 illustrates a displacement device in accordance with one embodiment.

FIG. 4 illustrates one such application, which is suitable for use as a resettable hood lifter. In this embodiment, the hood lifter is a pyro-activated dual chamber piston assembly generally designated 50 that includes at least one actuator comprising a shape memory material to selectively provide fluid communication between the two chambers, thereby equalizing the pressure in the chamber after an exothermic event.

The piston assembly 50 includes a piston 52 slidably engaged within a vessel 54. The vessel includes a top wall 56, a bottom wall 58, and sidewalls 60 extending therefrom. The piston 52 includes a shaft 62 integrated with or attached to a piston head 64, which defines a first chamber 66 and a second chamber 68 within the vessel 54. Vent valves 70, 72 are disposed in the sidewall 60 and positioned to vent chambers 66, 68 as may be desired. About the shaft 62 in biased communication with the top wall 56 and the piston head 64 is a reset spring 75. The piston head 64 includes at least one fluid passageway 74 (two of which are shown). A rotary disk 76 is disposed in or on surface 79 of the piston head and faces chamber 68. The rotatable disk 76 includes fluid openings 78 coaxial to openings 74 upon rotation of the disk to the open position and are misaligned upon rotation of the disk to the closed position (more clearly shown in FIG. 5). Rotation of the disk is effected by thermal activation of the shape memory material actuators, which are more clearly shown in FIG. 5 discussed below.

A pyrotechnic material 90 is disposed in the second chamber 68, which is in operative communication with a controller 92. The controller 80 selectively triggers discharge of the pyrotechnic material 92 so as to provide an exothermic reaction.

Figure 5:
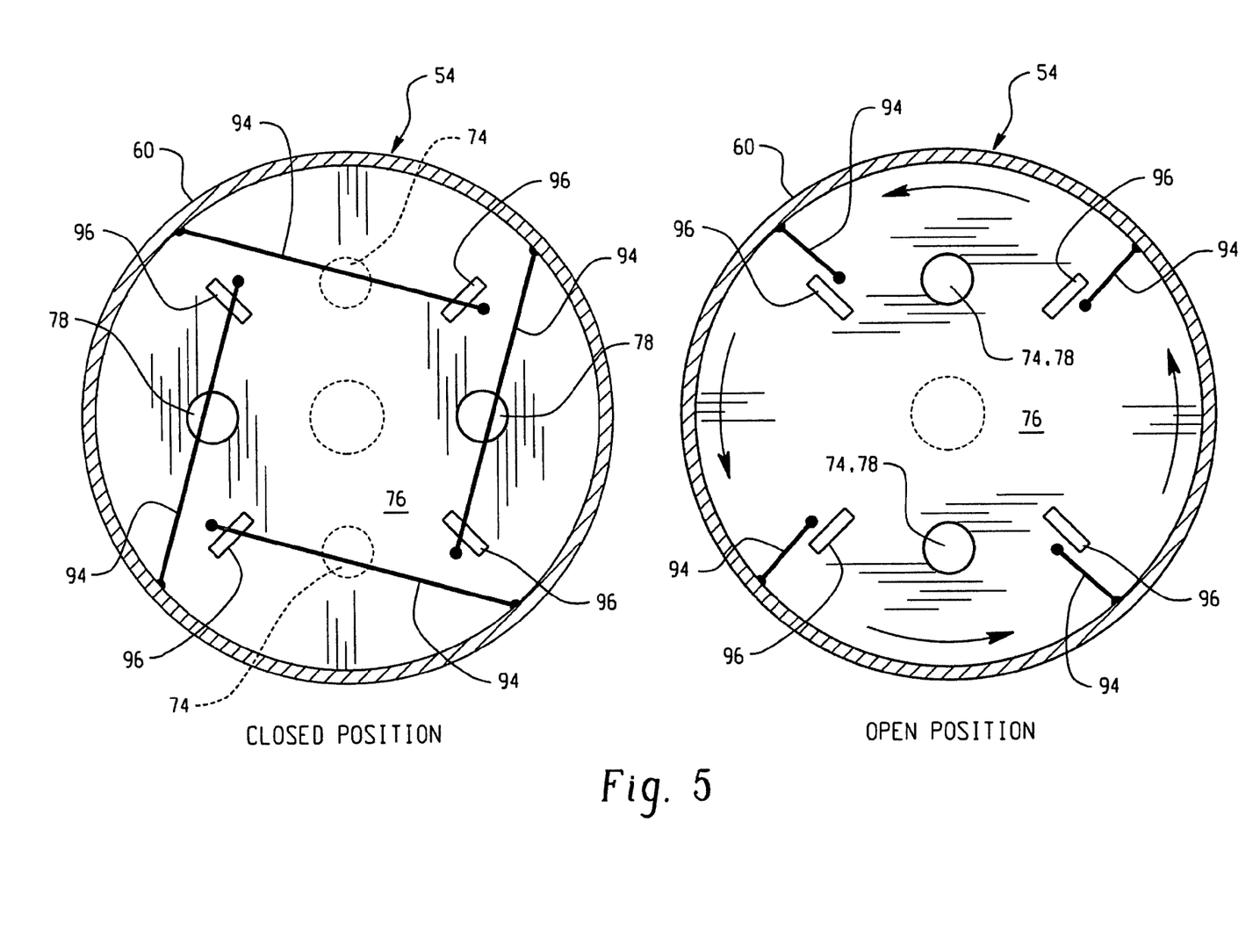
FIG. 5 illustrates sectional views of the piston head of FIG. 4 taken along lines 5-5 in the open and closed positions.

As shown in FIG. 5, the disk 76 is rotatably disposed on or within the piston head 64. One or more elements 94, e.g. wires, formed of the shape memory material that are pre-strained are attached at one end to the piston head 64 and at the other end to the rotatable disk 76. The elements 94 are in close proximity to a thermal conductor 96 disposed on or in the rotatable disk 76.

Upon triggering the pyrotechnic material 90, the resulting hot gases push the piston against the resistance offered by the piston reset spring (75 in FIG. 4) and the friction at the piston-cylinder interface. This results in energy being stored in the reset spring. The heat generated by the pyro discharge also gets transferred to the SMA elements 94 via the thermal conductors 96, thereby activating the SMA elements. The delay inherent in transferring heat from the discharge to 94 results in the piston beginning to displace upward before 94 are activated. The SMA elements work against the actuator rotational return spring (not shown in figures) and the frictional resistive forces to rotate the disk 76 in the base of the piston head. This allows direct fluid communication between the two chambers and thereby equalizing the pressure on both sides of the piston head. The net force pushing the piston up is then reduced significantly by the ratio $$\left(\frac{d_S}{d_P}\right)^2,$$

wherein $d_S$ is the diameter of the piston shaft and $d_P$ is the diameter of the piston head. The reset spring 75 is chosen such that it can, now, exert enough force to reset the piston by drawing on the energy stored in it from the deployment phase. The two vent valves can be opened to vent the pyrotechnic generated gas from the cylinder, e.g. when the pyrotechnic charge is refilled. The vents can be chosen to ensure that the piston head side gas pressure is not exceeded by the shaft side pressure as may be desired for some applications.

The actuator may further include a return spring (not shown) in operative communication with the rotatable disk 76 to provide a reset mechanism from the open position back to the closed position. Alternatively, a reset spring can be external to the actuator 80 and disposed in operative communication with the rotatable disk 76. In yet another embodiment, the resetting of the above 'reset' mechanism may be done during servicing of the component when the disk 76 may be rotated back to its initial position. This would return the SMA elements 94 to their pre-strained configuration.

When a return spring is used to reset the mechanism, the slower cooling rate of the shape memory material is used to an advantage in this application. As the element 94 comprising shape memory material cools at a rate that is slower than its heating rate, the actuators remain activated for a length of time, which allows the reset process enough time to complete.

The thermally activated shape memory material composition, the relative size and locations of the fluid passageways 74, 78, the reset spring 75 stiffness, the thermally conductive interface, inter-alia, can be chosen to ensure that the SMA elements 94 are activated at a time after the pyro is fired such that the activation does not compromise the device performance during deployment. In this manner, a hood in operative communication with the piston assembly can be rapidly lifted. The heated gas that is released during the exothermic reaction is effective to thermally change a dimension, a shape, an orientation, an elastic modulus, or a combination comprising at least one of the foregoing properties of the shape memory actuator in an amount effective to overcome the friction rotative forces associated with movement of the disk 76 and the return springs. The vents in each respective chamber compensate for the pressure differential caused by the rapid movement of the piston within the vessel.

Figure 6:
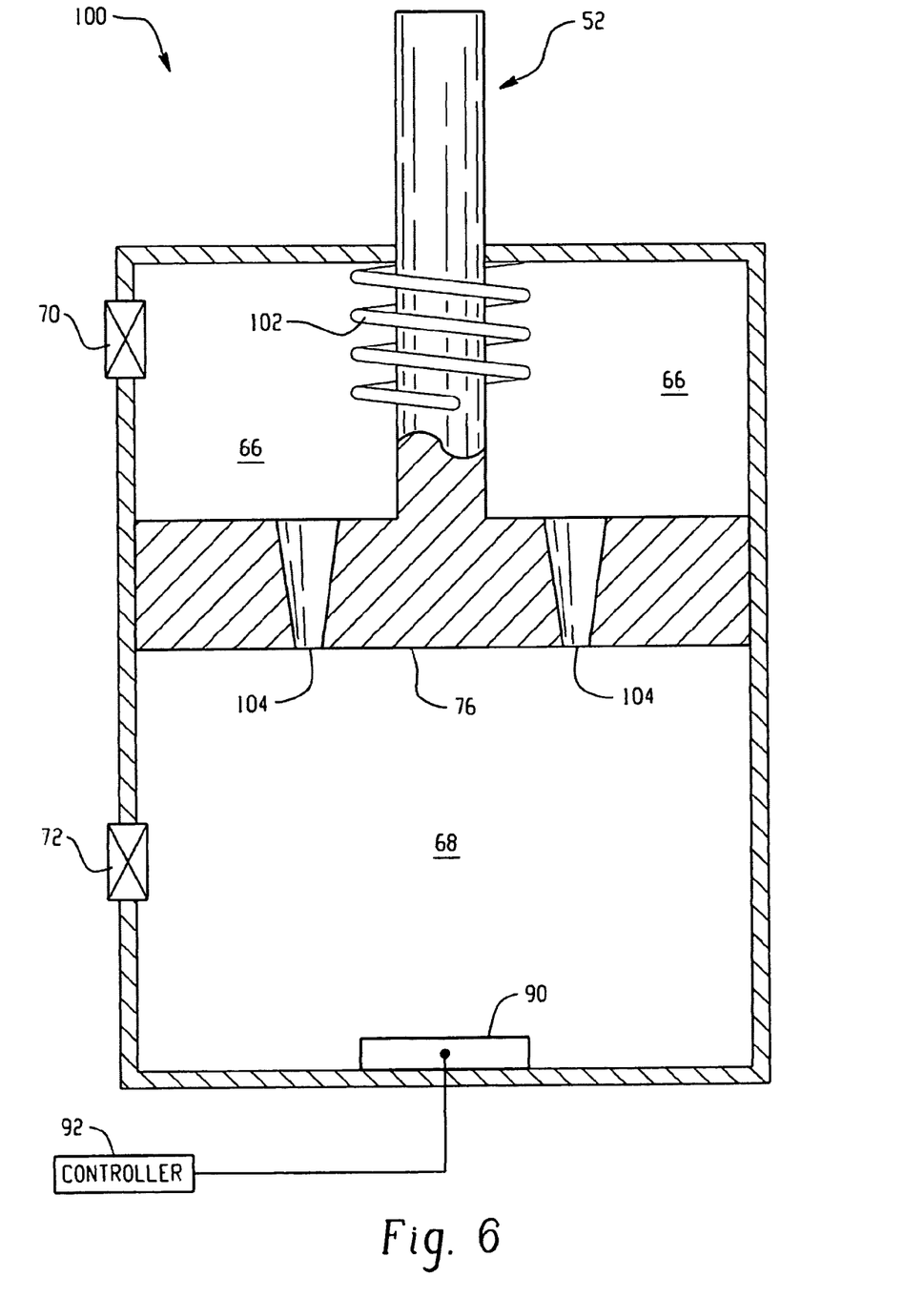
FIG. 6 illustrates a displacement device in accordance with another embodiment.

In another embodiment shown in FIG. 6, the lifter, generally designated by reference numeral 100, includes a spring in biased communication with the top wall of the vessel and the piston head. The spring is formed of the shape memory material. Diffusers 104 are disposed within the piston head 76 and provide controlled fluid communication between the chambers 66, 68.

Following exothermic discharge of the pyrotechnic material, the hot expanding gases push the piston 52 up and flow through the diffusers 104 into chamber 66. The pressure drop across the diffuser 104 ensures that the shaft-side pressure remains below the pyro-side pressure, and also serves to protect the spring 102 from the high pressure spikes accompanying the exothermic discharge. Optionally, the spring 102 may be covered with a thermal sleeve or coating to protect it from overheating. Using a shape memory alloy (SMA) material as an example, the relatively soft martensite phase of the spring 102 is initially compressed pseudoplastically by the expanding hot gases during the deploy phase. As the SMA is heated, it undergoes a martensite to austenite phase transition, and tries to revert to the original configuration of the SMA. In this condition, the stiffness of the A-phase SMA spring is much higher than the stiffness of the martensite phase SMA spring that was compressed during deployment. The system is designed such that the restoring force exerted by the austenite phase SMA spring is enough to reset the piston.

As before, the vent valves 70, 72 can be used to purge the gases when the pyrotechnic charge is refilled. The diffuser cross-sectional profiles, the SMA composition and spring characteristics, thermal sleeve/coating design and the like can be optimized as would be appreciated by those in the art to ensure that the reset procedure does not compromise the deployment performance of the system.

In another embodiment, drawstrings formed of the shape memory material can be laced on the inside of pyrotechnic deployed inflatables. The drawstrings are covered by thermal sleeves/coatings to protect them from overheating. The drawstrings are backed against the membrane of the inflatable system to brace them against the pressure loading from the exotherm produced during discharge of the pyrotechnic material.

Again, using shape memory alloys as an example, the martensite phase drawstrings are stretched pseudo-plastically by the pyrotechnic deployment of the inflatable. The heat generated by the pyrotechnic burst, subsequently, transforms the SMA into the austenite phase. This transformation causes the drawstrings to recover their original (or strain-free) configuration, which in turn, causes the inflatables to pull back. This can be adapted to assist the egress of passengers after a deployment event.

By way of illustration, a pyrotechnic device such as a passive restraint inflatable system is mounted on the steering wheel, dashboard, knee bolster, instrument panel/glove box door, pillars, interior door panels, roof liner, seats, headrest, armrest, center console, and the like of a vehicle. The exemplary vehicle member is a steering column/wheel/hub that includes structural members formed of and/or in operative communication with a shape memory alloy. Upon an impact event, the passive restraint inflatable system in the steering wheel/wheel/hub is deployed, releasing heated gas. The heated gas can be used to, directly or indirectly, change a phase of the shape memory material in the steering column/wheel/hub, which, in one configuration, causes the shape memory material to regain its original configuration. As a result of the shape memory alloy material in the vehicle member returning to its original configuration, the steering column/wheel/hub can be made to be more compliant to the occupant and/or is moved away from the occupant. As such, the shape change and/or flexural property change of the steering column/wheel/hub to its original configuration can be adapted to dampen the impact of the steering column/wheel/hub against the occupant and/or can be made to improve egress and extraction of the occupant after the collision. In the event an impact does not occur and there is no release of pyrotechnic gases by a pyrotechnic device 14, the vehicle member 10 will not be thermally activated to change an attribute so as to maintain the mechanical integrity of the vehicle member 10.

Rapid displacement can be desirable for various types of vehicle members. For example, rapid deployment in the form of an expanded configuration can be configured to absorb the kinetic energy associated with impact of an object or a vehicle. By way of illustration, the at least one shape memory material may be strategically positioned to provide expansion in deployable knee bolsters and in deployable interior surfaces. For example, suitable deployable interior surfaces include door interiors, pillars, headrests dashboards and the like.

The various examples provided herein are merely exemplary and are not intended to be limiting. The vehicle member advantageously provides a change in at least one attribute by thermal activation upon a pyrotechnic event, thereby providing a means for rapid actuation of vehicle members. Desirably, the change in the property of the shape memory material remains for the duration of the thermal activation. Also desirably, upon discontinuation of the thermal activation, the property reverts substantially to its original form prior to the change. In this manner, reversibility (and resetting) can advantageously occur as well as be controlled.

Thermally activated shape memory materials generally refer to materials or compositions that have the ability to remember their original shape, which subsequently can be recalled by applying a thermal stimulus (i.e., a thermal activation signal). As such, deformation of the shape memory material from the original shape can be a temporary condition. Exemplary thermally activated shape memory materials include shape memory alloys (SMAs), shape memory polymers (SMPs), shape memory ceramics (SMCs), composites of the foregoing shape memory materials with non-shape memory materials, and combinations comprising at least one of the foregoing shape memory materials. For convenience and by way of example, reference herein will be made to shape memory alloys, and shape memory polymers. The shape memory ceramics, and the like can be employed in a similar manner as will be appreciated by those skilled in the art in view of this disclosure. SMCs are similar to SMAs but can tolerate much higher operating temperatures than can other shape-memory materials. SMPs can be used in a different way. Currently SMPs cannot produce a substantial restoring force when they are thermally activated. However, they undergo large changes in their elastic modulus. This can be used to release elastic energy stored in other components (e.g. springs) that are in operative communication with the SMP as will be apparent to those skilled in the art in view of this disclosure.

Shape memory alloys are alloy compositions with at least two different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$). When the shape memory alloy is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). It should be noted that the above-mentioned transition temperatures are functions of the stress experienced by the SMA sample. Specifically, these temperatures increase with increasing stress. In view of the foregoing properties, deformation of the shape memory alloy is preferably at or below the austenite transition temperature (at or below $A_s$). Subsequent heating above the austenite transition temperature causes the deformed shape memory material sample to revert back to its permanent shape. Thus, a suitable activation signal for use with shape memory alloys is a thermal activation signal having a magnitude that is sufficient to cause transformations between the martensite and austenite phases.

The temperature at which the shape memory alloy remembers its high temperature form when heated can be adjusted by slight changes in the composition of the alloy and through thermo-mechanical processing. In nickel-titanium shape memory alloys, for example, it can be changed from above about 100° C. to below about –100° C. The shape recovery process can occur over a range of just a few degrees or exhibit a more gradual recovery. The start or finish of the transformation can be controlled to within a degree or two depending on the desired application and alloy composition. The mechanical properties of the shape memory alloy vary greatly over the temperature range spanning their transformation, typically providing shape memory effect, superelastic effect, and high damping capacity. For example, in the martensite phase a lower elastic modulus than in the austenite phase is observed. Shape memory alloys in the martensite phase can undergo large deformations by aligning the crystal structure with the applied stress. The material will retain this shape after the stress is removed.

Suitable shape memory alloy materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in crystal structure, dimension, shape, orientation, yield strength, flexural modulus, damping capacity, superelasticity, and/or similar properties. Selection of a suitable shape memory alloy composition depends on the temperature range where the component will operate.

Generally, SMPs are phase segregated co-polymers comprising at least two different units, which may be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment may be crystalline or amorphous and will have a corresponding melting point or glass transition temperature (Tg), respectively. The term "thermal transition temperature" is used herein for convenience to generically refer to either a Tg or a melting point depending on whether the segment is an amorphous segment or a crystalline segment. For SMPs comprising (n) segments, the SMP is said to have a hard segment and (n-1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be shaped. A permanent shape for the SMP can be set or memorized by subsequently cooling the SMP below that temperature. As used herein, the terms "original shape", "previously defined shape", and "permanent shape" are synonymous and are intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment while maintaining the deforming external stress or load.

The permanent shape can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it may be possible to demonstrate multiple permanent shapes. Similarly using a layered or composite approach, a combination of multiple SMPs will demonstrate transitions between multiple temporary and permanent shapes.

For SMPs with only two segments, the temporary shape of the shape memory polymer is set at the first transition temperature, followed by cooling of the SMP, while under load, to lock in the temporary shape. The temporary shape is maintained as long as the SMP remains below the first transition temperature. The permanent shape is regained when the SMP is once again brought above the first transition temperature with the load removed. Repeating the heating, shaping, and cooling steps can repeatedly reset the temporary shape.

Most SMPs exhibit a "one-way" effect, wherein the SMP exhibits one permanent shape. Upon heating the shape memory polymer above a soft segment thermal transition temperature without a stress or load, the permanent shape is achieved and the shape will not revert back to the temporary shape without the use of outside forces.

As an alternative, some shape memory polymer compositions can be prepared to exhibit a "two-way" effect, wherein the SMP exhibits two permanent shapes. These systems include at least two polymer components. For example, one component could be a first cross-linked polymer while the other component is a different cross-linked polymer. The components are combined by layer techniques, or are interpenetrating networks, wherein the two polymer components are cross-linked but not to each other. By changing the temperature, the shape memory polymer changes its shape in the direction of a first permanent shape or a second permanent shape. Each of the permanent shapes belongs to one component of the SMP. The temperature dependence of the overall shape is caused by the fact that the mechanical properties of one component ("component A") are almost independent from the temperature in the temperature interval of interest. The mechanical properties of the other component ("component B") are temperature dependent in the temperature interval of interest. In one embodiment, component B becomes stronger at low temperatures compared to component A, while component A is stronger at high temperatures and determines the actual shape. A two-way memory device can be prepared by setting the permanent shape of component A ("first permanent shape"), deforming the device into the permanent shape of component B ("second permanent shape"), and fixing the permanent shape of component B while applying a stress.

It should be recognized by one of ordinary skill in the art that it is possible to configure SMPs in many different forms and shapes. Engineering the composition and structure of the polymer itself can allow for the choice of a particular temperature for a desired application. For example, depending on the particular application, the last transition temperature may be about 0° C. to about 300° C. or above. A temperature for shape recovery (i.e., a soft segment thermal transition temperature) may be greater than or equal to about −30° C. Another temperature for shape recovery may be greater than or equal to about 40° C. Another temperature for shape recovery may be greater than or equal to about 100° C. Another temperature for shape recovery may be less than or equal to about 250° C. Yet another temperature for shape recovery may be less than or equal to about 200° C. Finally, another temperature for shape recovery may be less than or equal to about 150° C.

Suitable shape memory polymers can be thermoplastics, thermosets-thermoplastic copolymers, interpenetrating networks, semi-interpenetrating networks, or mixed networks. The SMP "units" or "segments" can be a single polymer or a blend of polymers. The polymers can be linear or branched elastomers with side chains or dendritic structural elements. Suitable polymer components to form a shape memory polymer include, but are not limited to, polyphosphazenes, poly(vinyl alcohols), polyamides, polyimides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecylacrylate). Examples of other suitable polymers include polystyrene, polypropylene, polyvinyl phenol, polyvinylpyrrolidone, chlorinated polybutylene, poly(octadecyl vinyl ether), poly (ethylene vinyl acetate), polyethylene, poly(ethylene oxide)-poly(ethylene terephthalate), polyethylene/nylon (graft copolymer), polycaprolactones-polyamide (block copolymer), poly(caprolactone) diniethacrylate-n-butyl acrylate, poly(norbornyl-polyhedral oligomeric silsequioxane), polyvinylchloride, urethane/butadiene copolymers, polyurethane-containing block copolymers, styrene-butadiene block copolymers, and the like. The polymer(s) used to form the various segments in the SMPs described above are either commercially available or can be synthesized using routine chemistry. Those of skill in the art can readily prepare the polymers using known chemistry and processing techniques without undue experimentation.

As will be appreciated by those skilled in the art, conducting polymerization of different segments using a blowing agent can form a shape memory polymer foam, for example, as may be desired for some applications. The blowing agent can be of the decomposition type (evolves a gas upon chemical decomposition) or an evaporation type (which vaporizes without chemical reaction). Exemplary blowing agents of the decomposition type include, but are not intended to be limited to, sodium bicarbonate, azide compounds, ammonium carbonate, ammonium nitrite, light metals which evolve hydrogen upon reaction with water, azodicarbonamide, N, N'-dinitrosopentamethylenetetramine, and the like. Exemplary blowing agents of the evaporation type include, but are not intended to be limited to, trichloromonofluoromethane, trichlorotrifluoroethane, methylene chloride, compressed nitrogen, and the like.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A vehicle assembly adapted for use with and for modifying a vehicle having a structural frame, said assembly comprising:
    a conformable structural member composing the frame;
    at least one thermally activatable shape memory material drivenly coupled to the conformable structural member;
    a pyrotechnic material in operative communication with the shape memory material, wherein the pyrotechnic material is effective to thermally change a dimension, a shape, an orientation, an elastic modulus property or a combination comprising at least one of the foregoing properties of the thermally activatable shape memory material in response to a triggering event, and wherein the change is operable to modify the conformable structural member; and
    an activation device for selectively discharging the pyrotechnic material.

2. The vehicle assembly of claim 1, wherein the thermally activatable shape memory material comprises a shape memory polymer.

3. The vehicle assembly of claim 1, wherein the pyrotechnic material is adapted to discharge a heated gas at a temperature that is effective to thermally change a dimension, a shape, an orientation, an elastic modulus property, or a combination comprising at least one of the foregoing properties to the shape memory material.

4. The vehicle assembly of claim 1, wherein the pyrotechnic material is adapted to radiate thermal energy to the shape memory material in an amount effective to change a dimension, a shape, an orientation, an elastic modulus property, or a combination comprising at least one of the foregoing properties to the shape memory material.

5. The vehicle assembly of claim 1, wherein the pyrotechnic material is adapted to conductively heat the shape memory material to a temperature that is effective to thermally change a dimension, a shape, an orientation, an elastic modulus property, or a combination comprising at least one of the foregoing properties to the shape memory material.

6. The vehicle assembly of claim 1, wherein the pyrotechnic material comprises a layer in contact with the shape memory material.

7. The vehicle assembly of claim 1, wherein the pyrotechnic material is distributed with the shape memory material.

8. The vehicle assembly of claim 1, wherein the conformable structural member is in operative communication with a second vehicle member, wherein thermal activation of the shape memory material is adapted to displace the second vehicle member.

9. The vehicle assembly of claim 1, wherein the conformable structural member is in operative communication with a second vehicle member, wherein thermal activation of the shape memory material is adapted to change compliance of the second vehicle member.

10. The vehicle assembly as claimed in claim 1, wherein the active material is shape memory alloy, and the pyrotechnic material is configured to heat the alloy through radiation or convection.

* * * * *